Figure 4:
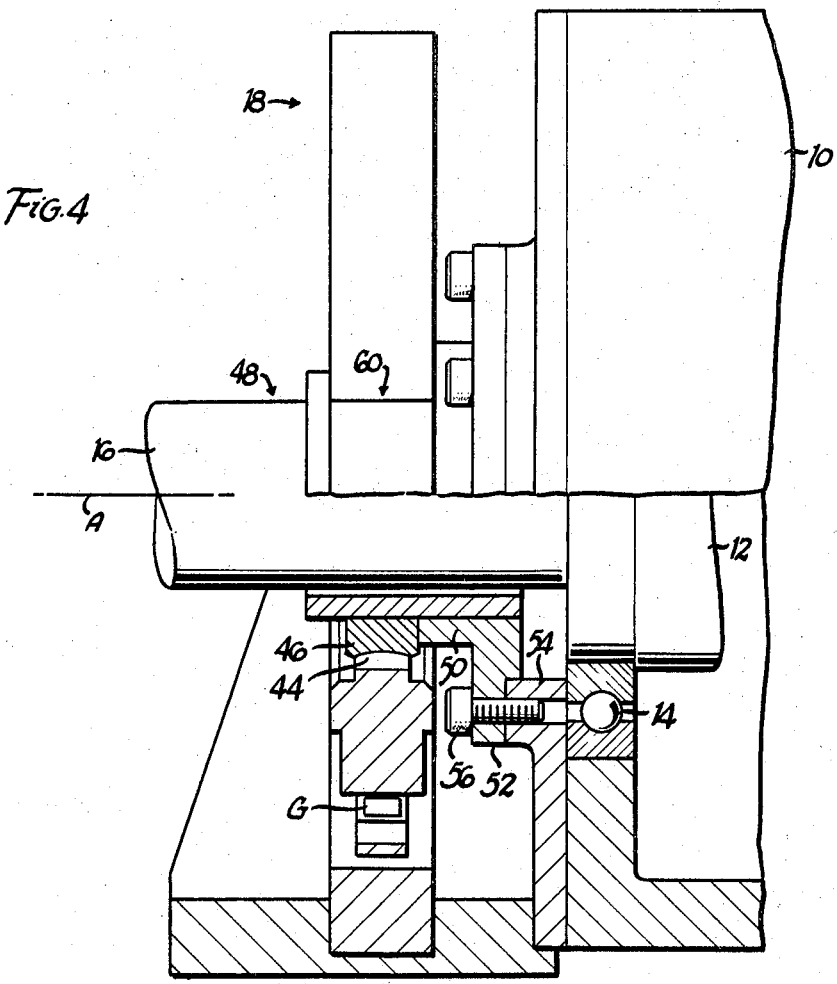

April 16, 1968  M. J. LEBOW  3,377,849
TORQUE SENSING APPARATUS
Filed June 6, 1966  4 Sheets-Sheet 1
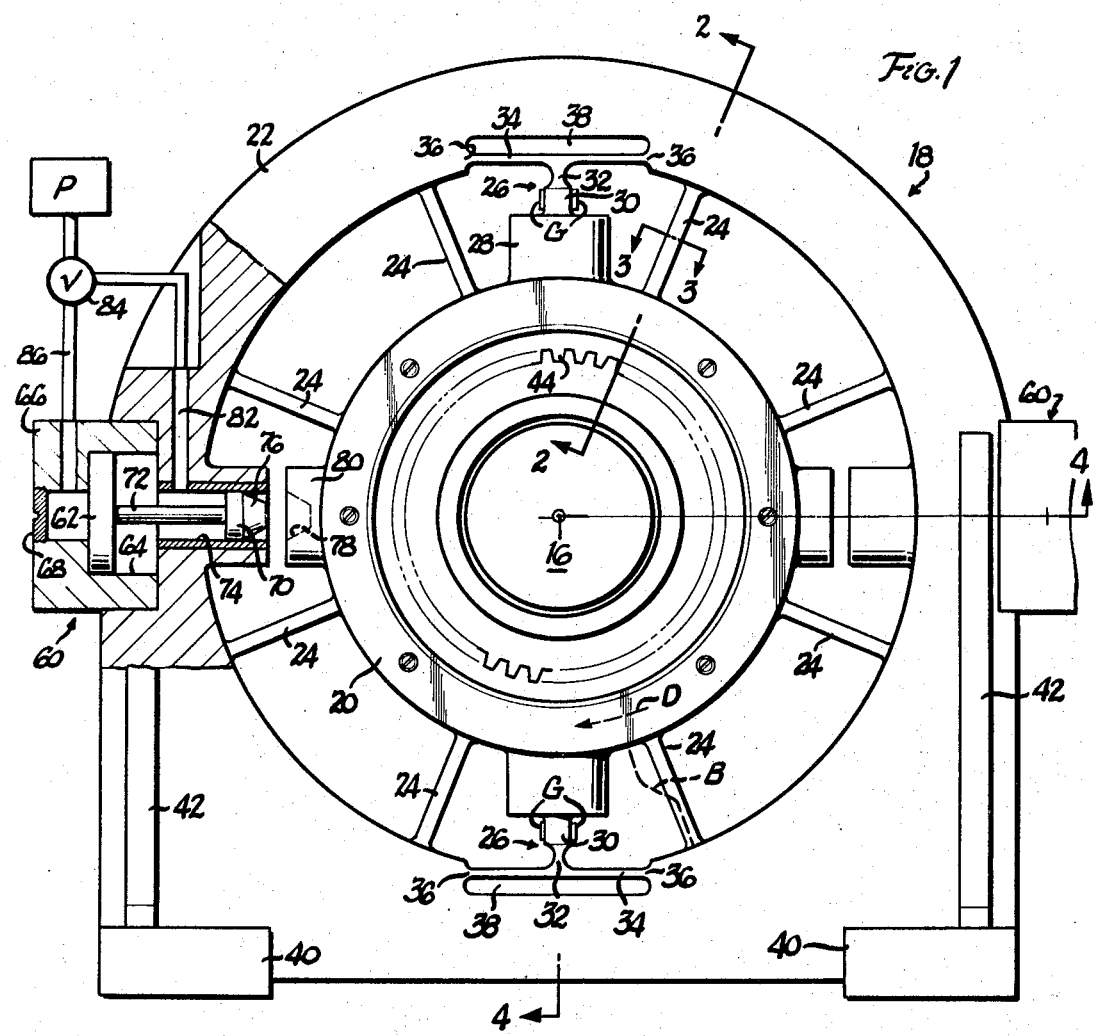
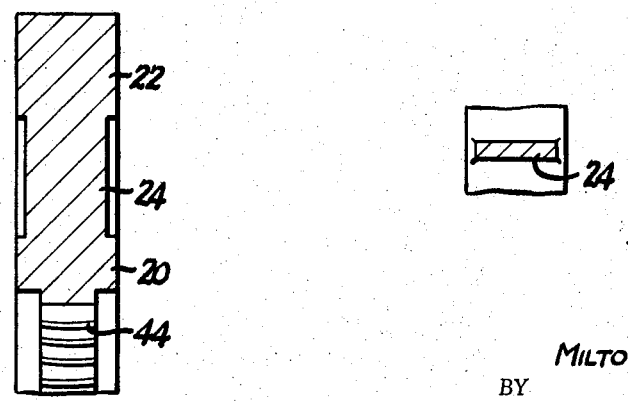
INVENTOR.
MILTON J. LEBOW
BY
WILSON, SETTLE, BATCHELDER
ATT'YS.  & CRAIG

INVENTOR.
MILTON J. LEBOW
BY
WILSON, SETTLE, BATCHELDER
ATT'YS. & CRAIG

Inventor:
MILTON J. LEBOW
WILSON, SETTLE, BATCHELDER
ATT'YS. & CRAIG

United States Patent Office 3,377,849
Patented Apr. 16, 1968

3,377,849
TORQUE SENSING APPARATUS
Milton J. Lebow, Oak Park, Mich., assignor to Lebow Associates, Inc., Oak Park, Mich., a corporation of Michigan
Filed June 6, 1966, Ser. No. 555,415
8 Claims. (Cl. 73—134)

This invention relates to torque sensing apparatus, and more particularly to sensing apparatus of the type wherein the sensing apparatus supports two structures for rotation relative to each other and is also capable of generating a signal proportional to the torque applied between the two relatively rotatable structures.

In conventional reaction dynamometers of the type used in testing automotive engines, hydraulic pumps, electric motors, etc., the stator of the dynamometer is normally supported upon ball bearings or oil-floated trunnion bearings for rotation in coaxial relationship with the dynamometer rotor which is driven by the device under test. Where ball bearing mountings are employed, frictional forces are introduced which influence the torque measurement. The oil-floated trunnion bearings provide a relatively frictionless mounting, but may create problems of alignment. Further, in the oil floated bearings, the exact condition of the oil film within the bearing is difficult to determine. In both types of bearings, variation of the relationship between the rotor, stator and support assemblies can occur under normal operating conditions by virtue of thermal expansion, structural distortions under load and minor inaccuracies in initial structural alignment.

Accordingly, it is an object of the present invention to provide a torque sensing apparatus in which the torque force absorbing structure is positively connected to and supported directly by the torque sensing apparatus itself.

It is another object of the invention to provide a torque sensing apparatus which will accurately and precisely measure torque loads without transmitting extraneous forces, such as those induced by minor misalignments or variations between the elements during operation.

It is another object of the invention to provide a torque sensing apparatus in which a single one-piece or integrally fabricated or secured structural element is positively and fixedly coupled to the torque absorbing structure to support the torque absorbing structure for rotary deflection under torque load.

In addition to its adaptation to reaction dynamometers, the present invention can also be adapted for torque sensing measurements in other environments. Because of its one-piece construction and ability to support a substantial amount of weight, the torque sensing apparatus of the present invention is capable of also being employed to measure the torque applied to a vehicle wheel while the wheel is in place on the vehicle and being used under normal operating conditions.

The foregoing, and other objects are achieved in a torque sensing apparatus in which concentric inner and outer annular members are integrally connected to each other by a plurality of radially extending spokes. The spokes are of an elongate rectangular transverse cross section having their major dimension extending axially of the common axis of the two annular members and thus possess substantial rigidity to relative movement of the two annular members in an axial direction while at the same time providing sufficient stiffness against deflection under radially directed loads. Being relatively thin their circumferential extent, the spokes are capable of resiliently resisted deflection out of their normal radial relationship so that angular displacement of the two annular members relative to each other about their common axis can occur. To measure the torque load inducing such angular deflection, a plurality of cantilever beam members are integrally formed upon the inner angular member and project radially outwardly from the inner member to respective outer ends which in turn are integrally coupled to a tangentially extending web. The web in turn is integrally coupled to the outer annular member and is capable of resilient deflection toward and away from the common axis of the two members to transmit torque loads to the outer end of the cantilever beam while at the same time being capable of flexing sufficiently to prevent the introduction of forces tending to distort the torque induced deflection of the cantilever beam section.

Deflection of the cantilever beam is measured by the use of conventional resistance type strain gages bonded to the beam in which a change in electrical resistance proportional to the beam deflection is induced.

Other objects and features of the invention will become apparent by reference to the following specification and to the drawings.

Figures 5, 6:
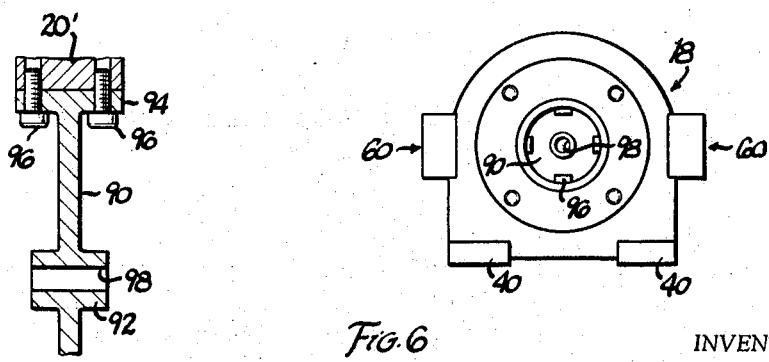
Figure 7:
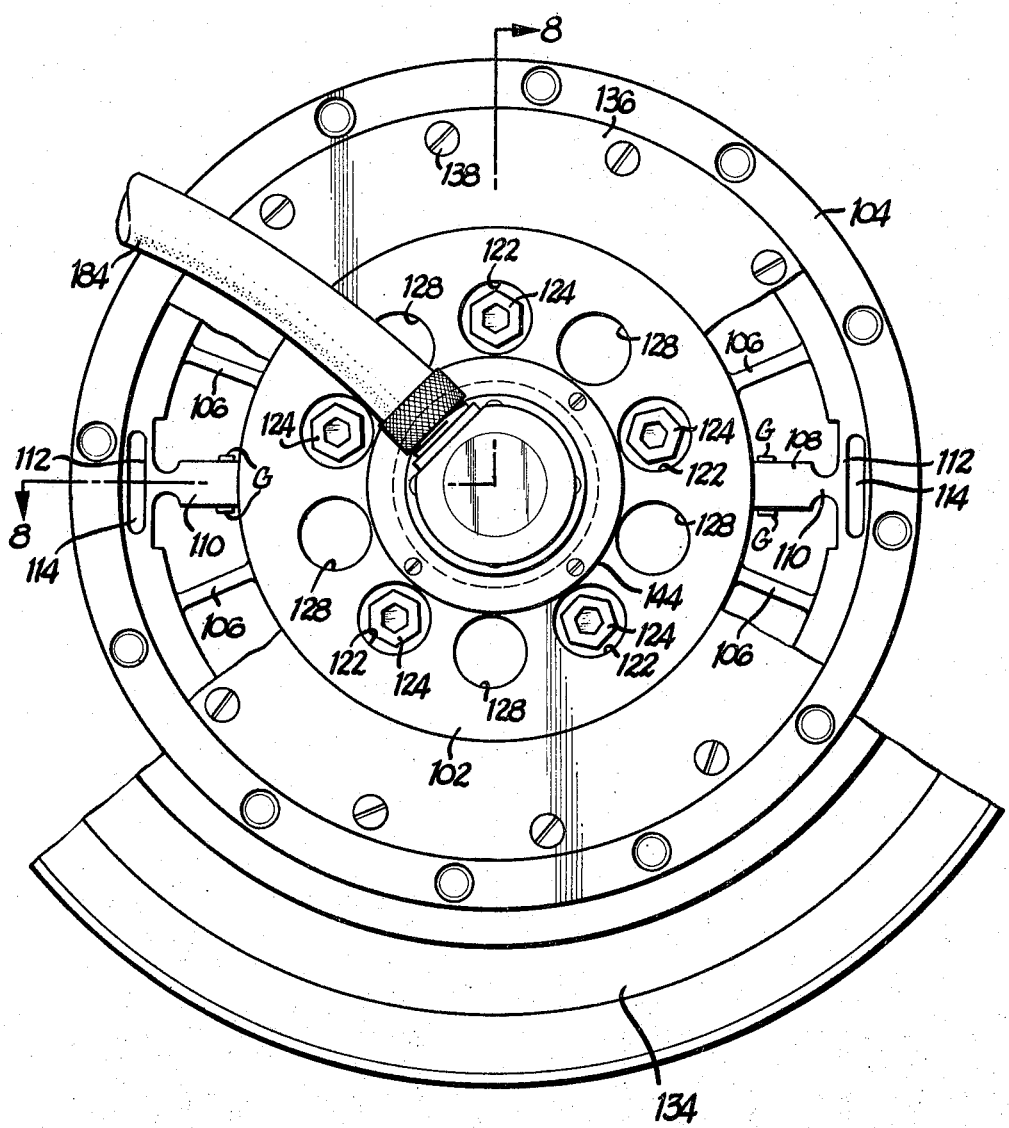
Figure 8:
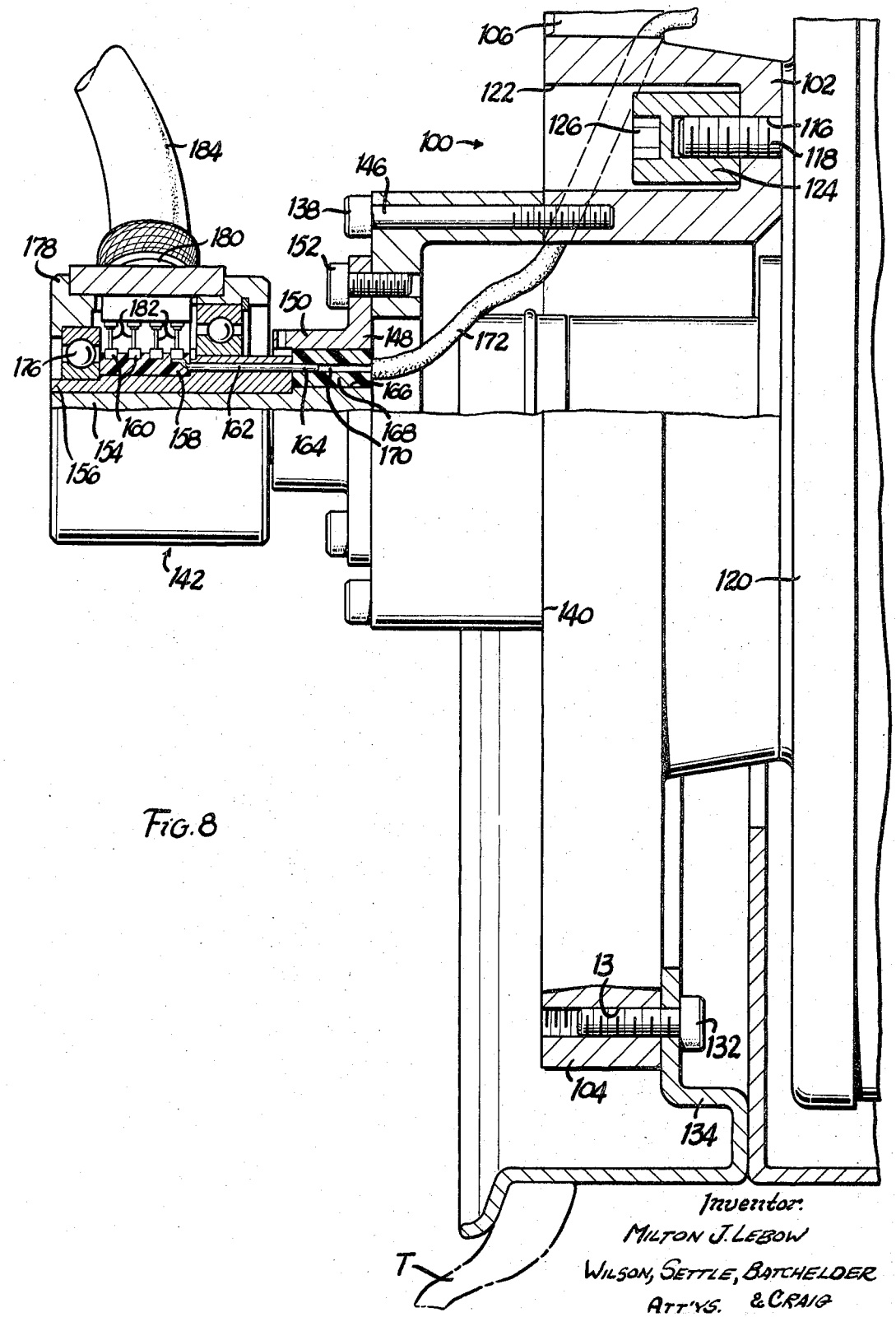

In the drawings:
FIGURE 1 is an end elevational view of one form of torque sensing apparatus embodying the present invention;
FIGURE 2 is a detailed cross sectional view of the structure of FIGURE 1 taken on line 2—2 of FIGURE 1;
FIGURE 3 is a detailed cross sectional view taken on line 3—3 of FIGURE 1;
FIGURE 4 is a staggered cross sectional view taken on line 4—4 of FIGURE 1;
FIGURE 5 is a detail cross sectional view, similar to FIGURE 2, showing another form of the invention;
FIGURE 6 is an end elevational view of the embodiment of FIGURE 5;
FIGURE 7 is a side elevational view of a modified form of the invention; and
FIGURE 8 is a detailed cross sectional view taken on line 8—8 of FIGURE 7.

In the embodiments of FIGURES 1 through 4, one form of the present invention is shown employed as a torque sensing device to measure the torque applied to a reaction dynamometer. Referring briefly to FIGURE 4, one end portion of the dynamometer stator is shown at 10, while the dynamometer rotor is partially indicated at 12. The rotor 12 is supported for rotation within stator 10 in a conventional manner for free rotation relative to the stator as by bearings 14. The rotor shaft 16 projects freely thruogh an opening in the end of stator 10 and the extended shaft 16 is coupled to be driven in rotation by the engine or other device under test in a well known manner.

The dynamometer may take the form of an electrical generator in which, when shaft 16 is driven by the engine or other device under test, generates an electric current. Upon the application of an electrical load to the output of the generator, a torque reaction is exerted upon dynamometer stator 10. By measuring this torque reaction, the power output of the engine under test can be computed. The present invention is particularly concerned with obtaining a precise and accurate measurement of the torque forces exerted upon the stator 10 and to support the stator in a manner such that the torque measurement is not influenced by extraneous factors such as friction, misalignment, variations due to thermal expansion of parts, and other extraneous factors.

In the form of the invention shown in FIGURES 1 through 4, the torque sensing apparatus takes the form of a one-piece structural element designated generally 18 which functions both as a support for the dynamometer stator 10 and also as a torque measuring or sensing element.

Structure 18 is formed with an inner annular member 20 which is concentrically supported within an outer an-

are provided on diametrically opposed sides of the structure. The stator lock 50 consists basically of a piston 62 reciprocable within a cylindrical bore 64 in a housing 66. One end of bore 64 is blocked as by suitable closure 68 and a locking tongue 70 is carried in spaced relationship to the front side of piston 64 by a pin 72, tongue 70 being slidably supported within a reduced diameter section 74 of bore 64. The front end of tongue 70 is tapered as at 76 to be seated within a tapered bore 78 formed in a protuberance 80 integral with or fixedly secured to inner annular member 20. In FIGURE 1, piston 62 is shown in its retracted position in which member 20 is free to rotate under torque loads. Piston 62 is moved to the position shown in FIGURE 1 by supplying air under pressure through a conduit 82, air pressure being supplied from a source schematically indicated at B and directed into conduit 82 by means of a conventional four-way valve 84. To move the assembly to its locking position, valve 84 is shifted to connect pressure source P to a second conduit 86 which communicates with the head side of piston 62, supplying pressure to drive the piston inwardly to seat tongue 70 in tapered bore 78. Two stator locks assemblies 60 are employed and are simultaneously actuated to provide a balanced application of force which not only locks inner member 20 against rotation relative to outer member 22, but also provides a positive acting force which accurately and positively holds member 20 in accurate centered relationship relative to outer member 22.

In FIGURES 5 and 6, a modified form of the structure of FIGURES 1 through 4 is disclosed. The embodiment of FIGURES 5 and 6 differs from the previously described embodiment of FIGURES 1 through 4 solely in the means employed to couple inner annular member 20 to stator 10. In the embodiment of FIGURES 5 and 6, this coupling means takes the form of a simple, relatively thin annular plate 90 which is formed with mounting flanges 92 and 94 on its inner and outer peripheries respectively. As best seen in FIGURE 5, annular plate 90 is of generally T-shaped configuration in cross section and its outer flange 94 is accurately conformed to the smooth inner periphery of the inner annular member 20' of the FIGURES 5 and 6 embodiment. Member 90 is fixedly secured to the inner annular member 20' as by bolts 96, while the inner flange 92 is bored at suitable locations as at 98 to permit the inner annular flange to be bolted directly to the nose piece 54' of the stator 10'.

While the flange portions 92 and 94 of the plate 90 are substantially rigid, the relatively thin annular central portion is capable of flexing out of its normal relationship in which the central portion lies in a general plane normal to the common axis of the inner and outer annular members. The plates provide sufficient stiffness to forces acting within this general plane, and thus the stator torque applied at inner flange 92 is transmitted, without distortion, to inner annular member 20. Flexing of plate 90 permits the necessary degree of axial displacement as well as a limited amount of tilting or rocking movement of the stator axis relative to the axis of the structure 18'. Apart from the particular structure employed to couple inner annular element 20' to stator 10', the remaining structure of the embodiment of FIGURES 5 and 6 is identical to that of FIGURES 1 through 4.

Referring now to FIGURES 7 and 8, a further embodiment of the present invention is shown in a form adapted to measure the torque exerted on a vehicle wheel in place on a vehicle. In principle and function the embodiment of FIGURES 7 and 8 is similar to the previously described embodiments with certain minor variations required by the fact that the structure is employed in a rotating wheel environment rather than a substantially stationary position.

As in the previous case, a torque sensing structure designated generally 100 is formed from a single piece of metal and includes inner and outer annular members 102 and 104 which are integrally joined to each other by a plurality of radially extending spokes 106. Spokes 106 are of an elongate rectangular transverse cross section, elongated axially of the structure, the cross sectional view of FIGURE 3 being equally applicable to the spokes 106 of the FIGURES 7 and 8 embodiment. This configuration of the spokes provides sufficient radial stiffness so that the spokes 106 function as the spokes of an ordinary wheel to support the weight of the vehicle and also to resist axially directed side loading applied during turning of the vehicle. As in the previous case, the spokes are capable of flexing to permit a resiliently resisted angular deflection of the two annular members relative to each other about their common axis, this deflection being induced by torque loading which is to be measured.

Cantilever beams 108 are integrally formed on inner annular member 102 and project radially outwardly from member 102 at diametrically opposed locations on the member. As in the previous case, a coupling section 110 of reduced thickness integrally couples the outer end of beam 108 to a tangentially extending web 112 which in turn is integrally joined at its opposite ends to circumferentially spaced locations on outer annular member 104. A slot-like recess or opening 114 is cut through member 104 to permit web 112 to flex toward and away from the axis of the assembly.

Inner annular member 102 is provided with five symmetrically spaced bores 116 which are located to receive the conventional wheel mounting studs 118 which project from the brake drum 120 of the vehicle wheel assembly. As best seen in FIGURE 8, bores 116 are formed with an enlarged diameter section 122 on the outer side of the member 102 to provide clearance for a cap-type nut 124 which may be provided with an Allen wrench receiving socket 126. A plurality of weight reducing bores 128 are likewise symmetrically located in inner annular member 102 between the mounting bores 116.

Outer annular member 104 is formed with a plurality of symmetrically spaced tapped bores 130 (FIGURE 8) which receive mounting bolts 132 by means of which a specially formed wheel rim assembly 134 is fixedly coupled to outer annular member 104. Preferably, a relatively large number of small tapped bores 130 are employed. Rim assembly 134 is constructed so that the wheel rim and tire T are located in their normal relationship to brake drum 120.

If maintenance of the normal relationship between the tire rim and brake drum is not critical, the original vehicle wheel may be mounted upon the torque sensing structure by employing a suitable proportioned adapter plate fixedly bolted to outer annular member 104 and carrying a set of suitably located wheel receiving studs.

An annular cover plate 136 is bolted to outer annular member 104 by mounting bolts 138, the inner edge 140 of cover plate 136 having a loose sliding fit with the outer periphery of inner annular member 102.

As in the previously described embodiment, the torque forces exerted between inner and outer annular member 102 and 104 are measured by mounting strain gages G upon the cantilever beams 108 to measure the deflection of the beams 108 under a torque load. Because the gages must thus rotate with the vehicle wheel, a slip-ring assembly designated generally 142 is employed to electrically connect the rotating strain gage leads to a stationary structure which may be coupled to the indicating or recording instruments.

Assembly 142 includes an annular mounting member 144 which is fixedly secured to inner annular member 102 as by a plurality of mounting bolts 146. Mounting member 144 serves to space a connector plate 148 axially clear of the outer end of the vehicle axle assembly. Plate 148 includes a base portion 150 fixedly mounted upon mounting member 144 as by bolts 152 and an integral axially projecting stub shaft 154 upon which is mounted a sleeve member 156. Sleeve member 156 is clamped, as by set screws 157 to stub shaft 154 and supports an annular member 158 of electrical insulating material upon which are fixedly mounted a series of slip-rings 160. An insulated cable 162 connects each slip-ring 160 to a projecting prong 164 which is electrically insulated from sleeeve 156.

The base portion 150 of connector plate 148 is constructed with a plurality of bores 166 within each of which is fixedly mounted a plug 168 of electrical insulating material which carries an electrically conductive socket 170 adapted to receive a prong 164 to electrically connect one of the slip-rings 160 to an electrical conduit such as 172 which in turn is connected to one of the individual strain gages G. The conduits 172 extend from connector plate 148 through the interior of mounting member 144 and pass through a suitably located bore or bores such as 174 into the space between inner and outer annular members 102 and 104.

A pair of bearings 176 rotatably support an outer sleeve 178 upon sleeve 156, and an electrical connector assembly 180 which carries a series of individual brushes 182 electrically insulated from each other is fixedly mounted in outer sleeve 178 so that the individual brushes slidably contact the respective slip rings 160. Because outer sleeve 178 is freely rotatable upon the rotating inner sleeve 156, the outer sleeve can be maintained stationary during rotation of the vehicle wheel and an electric cable 184 can conduct the signals from the various strain gages to the recording or indicating instrument.

In function and principle the embodiment of FIGURES 7 and 8 is similar to the previously described embodiment in that torque loads applied to the vehicle tire, as by acceleration or braking, cause relative rotation between inner and outer annular members 102 and 104. The torque force which induces the relative rotation of the inner and outer annular members is measured by measuring the deflection of the cantilever beams 108, thereby causing an indication from the strain gages G which is electrically conducted from the rotating wheel through the slip-ring assembly to a recording or indicating device.

While various embodiments of the invention have been described in detail, it will be apparent to those skilled in the art that the foregoing embodiments may be modified. Therefore, the foregoing description is to be considered exemplary rather than limiting, and the true scope of the invention is that defined in the following claims.

I claim:

1. Torque sensing apparatus comprising spaced inner and outer annular members concentric about a common axis and integrally joined to each other by a plurality of radial spokes, said spokes being capable of flexing movement accommodating limited rotation of said annular members relative to each other about said common axis while holding said annular members substantially rigid against axial and radial movement relative to each other, a web integrally joined at its opposite ends to circumferentially spaced locations on one of said annular members and extending tangentially of said common axis between said spaced locations in spaced relationship to said one of said annular members, a beam integral with the other of said annular members and projecting radially therefrom to an outer end integrally joined to the midpoint of said web, said web being operable upon rotation of said annular members relative to each other to cause said beam to bend from radial relationship to said common axis in deflection proportional to the torque forces inducing the relative rotation of the annular members.

2. Torque sensing apparatus as defined in claim 1 comprising means defining a circumferentially extending recess in the radially innermost wall of said outer annular member, said recess terminating at spaced opposed end walls constituting the spaced locations on said one of said annular members to which the ends of said web are joined, said web having an elongated rectangular transverse cross sectional configuration elongated in the direction parallel to said common axis and being capable of flexing movement toward and away from said common axis to accommodate movement of said outer end of said beam of said common axis upon torque induced deflection of said beam.

3. Torque sensing apparatus as defined in claim 2 wherein said beam comprises a main beam portion of constant thickness and an integral coupling portion of reduced thickness joining the outer end of said beam to said web.

4. In a reaction dynamometer having a fixed base and a dynamometer stator rotatable about its axis relative to said base; means for measuring the torque applied to said stator urging said stator in rotation about its axis comprising spaced inner and outer annular members concentric about a common axis and integrally joined to each other by a plurality of radial spokes, said spokes being capable of flexing movement accommodating limited rotation of said annular members relative to each other about said common axis while holding said annular members substantially rigid against axial and radial movement relative to each other, a web integrally joined at its opposite ends to circumferentially spaced locations on one of said annular members and extending tangentially of said common axis between said spaced locations in spaced relationship to said one of said annular members, a beam integral with the other of said annular members and projecting radially therefrom to an outer end integrally joined to the midpoint of said web, said web being operable upon rotation of said annular members relative to each other to cause said beam to bend from radial relationship to said common axis in deflection proportional to the torque force inducing the relative rotation of said annular members, means for coupling said inner annular member to said dynamometer stator with said stator axis coaxial with said common axis, said coupling means including means for holding said stator and inner annular member against rotation relative to each other about said common axis while accommodating relative movement of said stator and said inner annular member axially of said common axis.

5. Torque sensing apparatus as defined in claim 4 wherein said coupling means comprises a set of internal gear teeth integrally mounted on the inner periphery of said inner annular member, and a meshing set of external gear teeth fixedly coupled to said stator, the teeth of the external set of teeth having convex crowns to accommodate limited rocking movement of said stator axis and said common axis relative to each other.

6. Torque sensing apparatus as defined in claim 4 wherein said coupling means comprises a relatively thin annular plate fixedly secured at its outer peiphery to the inner periphery of said inner annular member, and means fixedly mounting the inner periphery of said annular plate upon said stator, said plate normally lying in a general plane normal to said common axis and being capable of flexing movement from said general plane to accommodate relative axial movement between the inner and outer peripheries of said plate.

7. Torque sensing apparatus for measuring the torque applied between the hub and rim of a vehicle wheel comprising spaced inner and outer annular members concentric about a common axis and integrally joined to each other by a plurality of radial spokes, said spokes being capable of flexing movement accommodating limited rotation of said annular members relative to each other about said common axis while holding said annular members substantially rigid against axial and radial movement relative to each other, a web integrally joined at its opposite ends to circumferentially spaced locations on one of said annular members and extending tangentially of said common axis between said spaced locations in spaced relationship to said one of said annular members, a beam integral with the other of said annular members and projecting radially therefrom to an outer end integrally joined to the midpoint of said web, said web being operable upon rotation of said annular members relative to each other to cause said beam to bend from radial relationship to said common axis in deflection proportional to the torque forces inducing the relative rotation of the annular members, means for fixedly coupling said inner annular member to said hub, and means for fixedly coupling said outer annular member to said rim of said vehicle wheel.

8. Torque sensing apparatus as defined in claim 7 further comprising a slip ring assembly fixedly mounted upon said inner annular member for rotation therewith, means for electrically connecting a gage element mounted on said beam to said slip ring assembly, and brush assembly means rotatably mounted on said slip ring assembly.

References Cited

UNITED STATES PATENTS

| 2,389,361 | 11/1945 | Hagg et al. | 73—134 |
| 2,403,952 | 7/1946 | Ruge | 73—136 |
| 2,845,795 | 8/1958 | Emmerling | 73—136 |
| 3,298,223 | 1/1967 | Dyer | 73—136 XR |

RICHARD C. QUEISSER, *Primary Examiner.*

CHARLES A. RUEHL, *Examiner.*